United States Patent Office 3,642,716
Patented Feb. 15, 1972

3,642,716
CONTROLLING MOLECULAR WEIGHT IN LACTONE POLYMERIZATION
Pieter A. Gautier and Herman Verbrugge, Amsterdam, Netherlands, assignors to Shell Oil Company, New York, N.Y.
No Drawing. Filed Nov. 4, 1968, Ser. No. 773,301
Claims priority, application Netherlands, Nov. 20, 1967, 6715750
Int. Cl. C08g 17/07
U.S. Cl. 260—78.3           6 Claims

ABSTRACT OF THE DISCLOSURE

A process for preparing polyesters having controlled molecular weight comprising (1) reacting a β-lactone with 0.014–2.2 mol percent of water and (2) in the presence of the reaction products thus obtained, polymerizing the unreacted β-lactone with an anionic initiator.

BACKGROUND OF THE INVENTION

It is known that polyesters having high molecular weight may be prepared by polymerization of β-lactones (the terms polymerization and polymers as hereinafter used in this specification include copolymerization and copolymers, respectively). For example, processes for polymerization of β-lactones with cationic or anionic initiators are described in French Pat. 1,231,163, which mentions a number of tertiary amines as examples of anionic initiators. Other anionic initiators include phosphines, arsines or stibines, as described in French Pat. 1,419,642.

A conventional process for the preparation of β-lactones consists of ring-closure of β-halogen-substituted carboxylic acids in the presence of aqueous bases, followed by the quickest possible extraction of the resulting β-lactone from the aqueous layer with the aid of an inert organic solvent. A process of this type is described, for example, by H. E. Zaugg in Organic Reactions, vol. 8, p. 309. The β-lactone which is subsequently isolated from the organic solvent will always contain some water. From British Pat. 766,347 it is known that water has a detrimental effect on the polymerization of β-lactones using anionic polymerization initiators, and it is considered necessary to remove the water to the greatest possible extent from β-lactones obtained in the above-described manner. Generally speaking, the polyesters which are preferred by polymerization of β-lactones with the aid of anionic initiators have molecular weight too high for many applications, particularly for the production of fibers and threads.

SUMMARY OF THE INVENTION

The present invention provides a process for polymerization of β-lactones to polyesters having controlled molecular weight range, which range can be selected according to the requirements of further processing needs. This is accomplished by first reacting the β-lactone with 0.014–2.2 mol percent of water (based upon the β-lactone) to effect hydrolytic splitting of the β-lactone with binding of the water and formation of carboxylic acids, optionally at elevated temperatures. Then in the presence of the products of said reaction, the unreacted β-lactone is polymerized with the aid of an anionic initiator. The amount of water determines the molecular weight of the polymer under given polymerization conditions.

DESCRIPTION OF PREFERRED EMBODIMENTS

The β-lactone to be polymerized preferably contains 4–10 carbon atoms. Especially preferred are β-propiolactones with a tertiary or quaternary α-carbon atom. In this context β-propiolactones are understood to be β-lactones with two hydrogen atoms at the β-carbon atom. Polymers with excellent properties are obtained by polymerization of α,α-dialkyl-β-propiolactones, in which each of the alkyl groups contain 1–4 carbon atoms. Examples of such monomers are α-ethyl-α-methyl-β-propiolactone, α-methyl-α-isopropyl-β-propiolactones and α-ethyl-α-n-butyl-β-propiolactone. Very good results were obtained in the homopolymerization of α,α-dimethyl-β-propiolactone (pivalolactone).

According to the invention the β-lactone is reacted with 0.014–2.2 mol percent of water, which in the case of, for example, pivalolactone corresponds with 25 p.p.m.–400 p.p.m. of water. Preferably the β-lactone is reacted with 0.014–0.28 mol percent of water since polymerization of the resulting mixture yields polyesters having molecular weights suitable for being processed into threads and fibers. If more than 2.2 mol percent of water is reacted with the β-lactone to be polymerized, the molecular weight of the polyester obtained after polymerization is virtually independent of the amount of water used and the rate of polymerization is adversely influenced.

The desired mixtures of water and β-lactone may be obtained by adding the requisite amount of water to anhydrous β-lactone, or by partial removal of water from a β-lactone which already contains water. Suitably the β-lactone and water are reacted at temperatures between 10° C. and 130° C., preferably between 20° C. and 80° C. Water removal can be effected, for example, by means of water-binding agents such as organic isocyanates, as described in French Pat. 1,341,074. However, this method is cumbersome and expensive. One of the significant advantages of the process of this invention is that for certain applications, such removal of water by means of water-binding agents can sometimes be completely omitted, so that when starting with water-containing β-lactone, preparation of polymer having the desired molecular weight can be simplified and accelerated.

Preferably the water content of the β-lactone is brought to the desired level as soon as possible after the preparation of the β-lactone. Since a number of β-lactones and in particular β-lactones with a tertiary or quaternary α-carbon atom, such as pivalolactone, are hygroscopic, storage and transport of these lactones must take place with the exclusion of water.

The reaction between water and β-lactone may be allowed to proceed to completion at any time before polymerization, for example, by applying heat immediately after the requisite amount of water has been introduced into the β-lactone, or shortly before the polymerization is started, or by simply storing the solution of β-lactone and desired amount of water for a sufficiently long time.

The duration of the temperature treatment required to react all of the water with the β-lactone in order to obtain a polymer with the desired molecular weight is dependent mostly on the temperature and to a smaller extent on the quantity of water. If the temperature treatment has taken place for too short a time, a polyester with a higher molecular weight is formed after polymerization than if the temperature treatment has lasted sufficiently long for all of the water to have reacted with the β-lactone. Thus, it was found, for example, that the reaction of 0.055 mol percent of water with pivalolactone at 40° C. is complete after 14 days, whereas at the same temperature 0.22 mol percent of water has not yet completely reacted after 30 days.

On the other hand at 60° C. the reaction between pivalolactone and 0.055 mol percent of water is complete after three days, and at 80° C. after one day.

Although it is possible to react only a portion of the water present in the β-lactone with β-lactone and polymerize the resultant mixture, the preparation of reproducible polymer wtih a pre-determined molecular weight is considerably more difficult than if all available water is reacted with the β-lactone. To prevent premature polymerization of β-lactone it is desirable that during the thermal treatment of the β-lactone/water mixtures contains a polymerization inhibitor as for example diazonium salts of complex fluorine-containing acids, such as p-chlorobenzene diazoniumhexafluorophosphate. Quantities between 0.0001 and 0.1 mol percent based on β-lactone, preferably 0.0005–0.05 mol percent are highly suitable.

According to the process of the invention an inert diluent may be present during the reaction between water and the β-lactone. Suitable diluents are those which need not be removed before the β-lactone is polymerized with the aid of an anionic initiator. Example of suitable diluents are isooctane, cyclohexane, toluene, benzene, dioxane, tetrahydrofuran and isopropyl acetate.

If after the preparation of the β-lactone the water content thereof is brought to a particular value between 0.014 and 2.2 mol percent, this will automatically determine the molecular weight of the polymer which is obtained by polymerization of the mixture produced after the complete reaction of the water with the β-lactone under given polymerization conditions such as temperature, dilution, type and amount of initiator.

As will be apparent to those skilled in the art, the availability of reacted β-lactone/water mixtures which yield polyester having a desired molecular weight after polymerization under standardized conditions will enable preparation of large quantities of polyester having uniform molecular weight without any special precautions or further additions of, for example, chain transfer agents.

The polymerization step can be carried out optionally in the presence of one or more inert diluents. These diluents may already be present during the reaction of water with the β-lactone as described above or they may be added after the reaction between water and β-lactone has taken place. If desired, the anionic polymerization initiator may be added dissolved in an inert diluent, or these initiators can also be added separately. Examples of suitable anionic initiators are inter alia trimethylamine, triethylene diamine, tetraphenyl phosphonium bromide, triphenyl butyl phosphonium bromide, triphenyl phosphine, tributyl phosphine, betaines and the like.

The conconcentration of the initiator in the reaction mixture can be varied within very wide limits, but usually lies between 0.0001 and 1 mol percent preferably between 0.001 and 0.5 mol percent, based on lactone.

The temperature at which the polymerization takes place is usually between 0° C. and 360° C. The pressure prevailing during the polymerization can best be atmospheric although higher or lower pressures can be used. Polymerization at higher temperatures will normally require higher pressures.

The polymerization according to the invention can be effected batchwise or continuously, for example, in a tubular reactor or in one or more reactors in which the composition of the reaction mixture is kept constant. The anionic iniator may be added continuously or in increments during the polymerization. In addition to the above components, the reaction mixture may, if desired, also contain one or more additives which are inert relative to the polymerization reaction, such as anti-oxidants, light stabilizers, nucleating compounds, pigments and the like, which are thus incorporated very homogeneously into the polyester product. These additives may be added to the β-lactone/water mixture before or during the reaction of the β-lactone with water, or they may be added to the mixture which has formed after the water has been reacted with the β-lactone.

Freshly prepared mixtures of pivalolacetone: 0.007% by weight of p-chlorobenzene diazonium hexafluorophosfluorophosphate (polymerization inhibitor) and varying amounts of water were reacted at different temperatures for specified times. The resulting mixtures (and for comparison also mixtures which had not been subjected to a temperature treatment) were all polymerized as follows:

5.0 ml. of mixture and 0.4 mol percent of triphenylphosphine (polymerization initiator) were added to 70 ml. of boiling, stirred 2,2,4-tri-methyl pentane. The resulting mixture was heated at its boiling point (approximately 100° C.) for 20 hours, with stirring. The resultant polymer was filtered off, washed with pentane and dried at 100° C. under a vacuum of 10 cm. Hg for one hour.

The intrinsic viscosity was determined for all polymers in benzyl alcohol at 150° C. Intrinsic viscosity is a measure of molecular weight and increases with increasing molecular weight.

EXAMPLE I

Freshly prepared mixtures of pivalolactone: 0.007% by weight of p-chlorobenzene diazonium hexafluorophosphate and 0.014 mol percent (25 p.p.m.), 0.055 mol percent (100 p.p.m.), 0.22 mol percent (400 p.p.m.) and 1.1 mol percent (2000 p.p.m.) of water, respectively, were raised to and maintained at a temperature with the exclusion of any further water. At various times samples of the mixtures were polymerized. Table I shows the intrinsic viscosities of the resulting polymers.

TABLE I.—PIVALOLACTONE PLUS WATER, 40° C.

| Mol percent of water in pivalolactone at time 0 | Reaction time, pivalolactone and water (days) | Intrinsic viscosity of resulting polymer (dl./g.) |
|---|---|---|
| 0.014 | 0 | 4.2 |
| 0.014 | 7 | 3.8 |
| 0.014 | 14 | 3.4 |
| 0.014 | 30 | 3.4 |
| 0.055 | 0 | 4.2 |
| 0.055 | 7 | 3.0 |
| 0.055 | 14 | 2.4 |
| 0.055 | 30 | 2.4 |
| 0.22 | 0 | 4.2 |
| 0.22 | 14 | 2.2 |
| 0.22 | 30 | 1.4 |
| 0.22 | 60 | 1.3 |
| 1.1 | 0 | 4.1 |
| 1.1 | 14 | 1.8 |
| 1.1 | 30 | 1.2 |
| 1.1 | 60 | 1.0 |

Table I demonstrates that at 40° C. the reaction between 0.055 mol percent of water and pivalolacetone is complete after 14 days whereas the reaction between pivalolactone and 0.22 mol percent of water is not yet entirely complete after 30 days.

EXAMPLE II

A freshly prepared mixture of pivalolacetone, 0.007 percent by weight of p-chlorobenzene diazonium hexafluorophosphate and 0.055 mol percent (100 p.p.m.) of water was raised to and maintained at a temperature of 60° C. with the exclusion of any further water. At various times samples of the mixture were polymerized. Table II shows the intrinsic viscosities of the resulting polymers. After three days the reaction between water and pivalolactone was found to be complete.

TABLE II

Pivalolactone+0.55 mol percent of water, 60° C.

| Reaction time pivalolactone and water (days) | Intrinsic viscosity of resulting polymer (dl./g.) |
|---|---|
| 0 | 4.2 |
| 3 | 2.4 |
| 6 | 2.4 |

EXAMPLE III

A freshly prepared mixture of pivalolactone, 0.0007% by weight of p-chlorobenzene diazonium hexafluorophosphate and 0.055 mol percent of water (100 p.p.m.) was raised to and maintained at a temperature of 80° C., with the exclusion of any further water. At various times samples of the mixture were polymerized. Table III shows the intrinsic viscosities of the resulting polymers. After one day the reaction between water and pivalolactone was found to be complete.

TABLE III

Pivalolactone+0.055 mol percent of water, 80° C.

| Reaction time pivalo-lactone and water (days) | Intrinsic viscosity of resulting polymer (dl./g.) |
| --- | --- |
| 0 | 4.2 |
| 1 | 2.4 |
| 2 | 2.4 |

We claim as our invention:

1. A process for the preparation of polyesters having controlled molecular weight range by polymerization of a β-lactone having a tertiary or quaternary alpha carbon atom and containing 4–10 carbon atoms which comprises the following sequence of steps: (1) reacting the β-lactone with 0.014–2.2 mol percent of water based on the lactone at a temperature between 10° and 130° C. in the presence of from 0.0005 to 0.05 mol percent, based upon β-lactone of p-chlorobenzene diazonium hexafluoro phosphate and (2) polymerizing in the presence of the reaction products thus obtained, the β-lactone which has not reacted with the water with the aid of an anionic initiator from the group consisting of tertiary amines, phosphines, arsines, stibines, phosphonium halides and betaines.

2. A process as in claim 1, wherein the β-lactone is an α,α-dialkyl-β-propiolactone, in which each of the alkyl groups contains 1–4 carbon atoms.

3. A process as in claim 1 wherein the β-lactone is pivalolactone.

4. A process as in claim 1, wherein step (1) 0.0.4–0.28 mol percent of water is reacted with β-lactone.

5. A process as in claim 1 wherein the temperature is between 20° C. and 80° C.

6. A process as in claim 1 wherein the step (2) the anionic initiator concentration is between 0.0001 and 1 mol percent, based on β-lactone and the temperature is between 0° C. and 360° C.

References Cited

UNITED STATES PATENTS

| 3,259,607 | 7/1966 | Cherdron et al. | 260—78.3 |
| 3,435,008 | 3/1969 | Schmitt et al. | 260—78.3 |
| 2,658,055 | 11/1953 | Alderson | 260—78.3 |
| 3,471,456 | 10/1969 | Kloofwijk et al. | 260—78.3 |

FOREIGN PATENTS

| 1,136,058 | 12/1968 | Great Britain | 260—343.9 |
| 639,463 | 5/1963 | Japan | 260—78.3 |
| 1179964 | 4/1965 | Netherlands | 260—78.3 |

OTHER REFERENCES

Beilstein, "Handbuch der Organische Chemie" Erstes Erganzungswerke, vol. XVII, p. 130, Springer, Berlin 1934.

WILLIAM H. SHORT, Primary Examiner

L. H. NIELSEN, Assistant Examiner

U.S. Cl. X.R.

260—484 A